(12) United States Patent
Wu

(10) Patent No.: US 7,958,643 B1
(45) Date of Patent: Jun. 14, 2011

(54) RETICLE

(76) Inventor: John Wu, Torrance, CA (US)

( * ) Notice: Subject to any disclaimer, the term of this patent is extended or adjusted under 35 U.S.C. 154(b) by 0 days.

(21) Appl. No.: 12/986,090

(22) Filed: Jan. 6, 2011

(51) Int. Cl.
*F41G 1/00* (2006.01)

(52) U.S. Cl. ............................................. 33/297; 33/298

(58) Field of Classification Search .................... 33/297, 33/298, 613, 645
See application file for complete search history.

(56) References Cited

U.S. PATENT DOCUMENTS

| | | | | |
|---|---|---|---|---|
| 4,205,916 A | * | 6/1980 | Vogl et al. | 33/297 |
| 4,263,719 A | * | 4/1981 | Murdoch | 33/297 |
| 4,359,282 A | * | 11/1982 | Garrison | 33/297 |
| 5,557,855 A | * | 9/1996 | Hwang | 33/613 |
| 6,745,484 B2 | * | 6/2004 | Horie et al. | 33/297 |
| 7,100,320 B2 | * | 9/2006 | Verdugo | 33/297 |
| 7,877,886 B1 | * | 2/2011 | Hamilton | 33/297 |
| 2008/0202011 A1 | * | 8/2008 | Shepherd | 42/130 |

* cited by examiner

*Primary Examiner* — Yaritza Guadalupe-McCall
(74) *Attorney, Agent, or Firm* — Clement Cheng

(57) ABSTRACT

A reticle comprises a horizontal section having horizontal section horizontal lines broken by horizontal section gaps between the horizontal section horizontal lines. A vertical section has vertical section vertical lines broken by vertical section gaps between the vertical section vertical lines. The horizontal section intersects the vertical section at a midpoint. A wide measurement ranging system includes range indicators including a highest range indicator, a plurality of intermediate range indicators, and a lowest range indicator. A height measurement ranging system has range indicators which include height measurement horizontal lines and which include a height measurement lowest range indicator closest to the vertical section, height measurement intermediate range indicators, and a height measurement highest range indicator.

18 Claims, 5 Drawing Sheets

| Range:<br>(m) | W = 50 (cm)<br>0.5 (m) | | H = 170 (cm)<br>1.7 (m) | |
|---|---|---|---|---|
| 50 | 10.00 | 36.00 | 34.00 | 122.40 |
| 100 | 5.00 | 18.00 | 17.00 | 61.20 |
| 150 | 3.33 | 12.00 | 11.33 | 40.80 |
| 200 | 2.50 | 9.00 | 8.50 | 30.60 |
| 250 | 2.00 | 7.20 | 6.80 | 24.48 |
| 300 | 1.67 | 6.00 | 5.67 | 20.40 |
| 350 | 1.43 | 5.14 | 4.86 | 17.49 |
| 400 | 1.25 | 4.50 | 4.25 | 15.30 |
| 450 | 1.11 | 4.00 | 3.78 | 13.60 |
| 500 | 1.00 | 3.60 | 3.40 | 12.24 |
| 550 | 0.91 | 3.27 | 3.09 | 11.13 |
| 600 | 0.83 | 3.00 | 2.83 | 10.20 |
| 650 | 0.77 | 2.77 | 2.62 | 9.42 |
| 700 | 0.71 | 2.57 | 2.43 | 8.74 |
| 750 | 0.67 | 2.40 | 2.27 | 8.16 |
| 800 | 0.63 | 2.25 | 2.13 | 7.65 |
| 850 | 0.59 | 2.12 | 2.00 | 7.20 |
| 900 | 0.56 | 2.00 | 1.89 | 6.80 |
| 950 | 0.53 | 1.89 | 1.79 | 6.44 |
| 1000 | 0.50 | 1.80 | 1.70 | 6.12 |
| 1050 | 0.48 | 1.71 | 1.62 | 5.83 |
| 1100 | 0.45 | 1.64 | 1.55 | 5.56 |
| 1150 | 0.43 | 1.57 | 1.48 | 5.32 |
| 1200 | 0.42 | 1.50 | 1.42 | 5.10 |
| 1250 | 0.40 | 1.44 | 1.36 | 4.90 |
| 1300 | 0.38 | 1.38 | 1.31 | 4.71 |
| 1350 | 0.37 | 1.33 | 1.26 | 4.53 |
| 1400 | 0.36 | 1.29 | 1.21 | 4.37 |
| 1450 | 0.34 | 1.24 | 1.17 | 4.22 |
| 1500 | 0.33 | 1.20 | 1.13 | 4.08 |
| (m) | Milrad | MOA | Milrad | MOA |

Fig. 7

RETICLE

FIELD OF THE INVENTION

The present invention is in the field of optical reticles.

DISCUSSION OF RELATED ART

A variety of different reticle patents are known in the art including mil-dot style patterns such as described in U.S. Pat. No. 7,701,975 issued to Farris Apr. 27, 2010 the disclosure of which is incorporated herein by reference. A wide variety of other different reticle styles have been described in the literature and some are the subject of United States patents. The present invention has an object to provide yet another useful reticle design.

SUMMARY OF THE INVENTION

A reticle comprises a horizontal section having horizontal section horizontal lines broken by horizontal section gaps between the horizontal section horizontal lines. A vertical section has vertical section vertical lines broken by vertical section gaps between the vertical section vertical lines. The horizontal section intersects the vertical section at a midpoint. A wide measurement ranging system includes range indicators including a highest range indicator, a plurality of intermediate range indicators, and a lowest range indicator. A height measurement ranging system has range indicators which include height measurement horizontal lines and which include a height measurement lowest range indicator closest to the vertical section, height measurement intermediate range indicators, and a height measurement highest range indicator.

The horizontal section has horizontal section vertical lines. The vertical section has vertical section horizontal lines. The range indicators are correlated to the width of the vertical section horizontal lines.

The reticle optionally includes a ring bounding the reticle. Vertical section gaps may have a thickness of approximately a thickness of vertical section vertical lines and horizontal section gaps may have a thickness of approximately a thickness of horizontal section horizontal lines. At least some of the vertical section gaps denote half of 0.1 mil and at least some of the horizontal section gaps denote half of 0.1 mil. The height measurement ranging system is preferably located in the top right quadrant of the reticle. The height measurement ranging system may include at least fourteen height measurement horizontal lines. The height measurement ranging system includes height measurement horizontal lines, at least some of which have a height measurement vertical line extending downward from a midpoint of a height measurement horizontal line. The wide measurement ranging system has wide measurement range indicators set for 0.5 meters in width. The height measurement ranging system has height measurement range indicators set for 1.7 meters in height. The target clear spot is preferably immediately above the midpoint.

BRIEF DESCRIPTION OF THE DRAWINGS

FIG. 7 is a chart of correlations of range to MOA/milrad.

Figure 1:
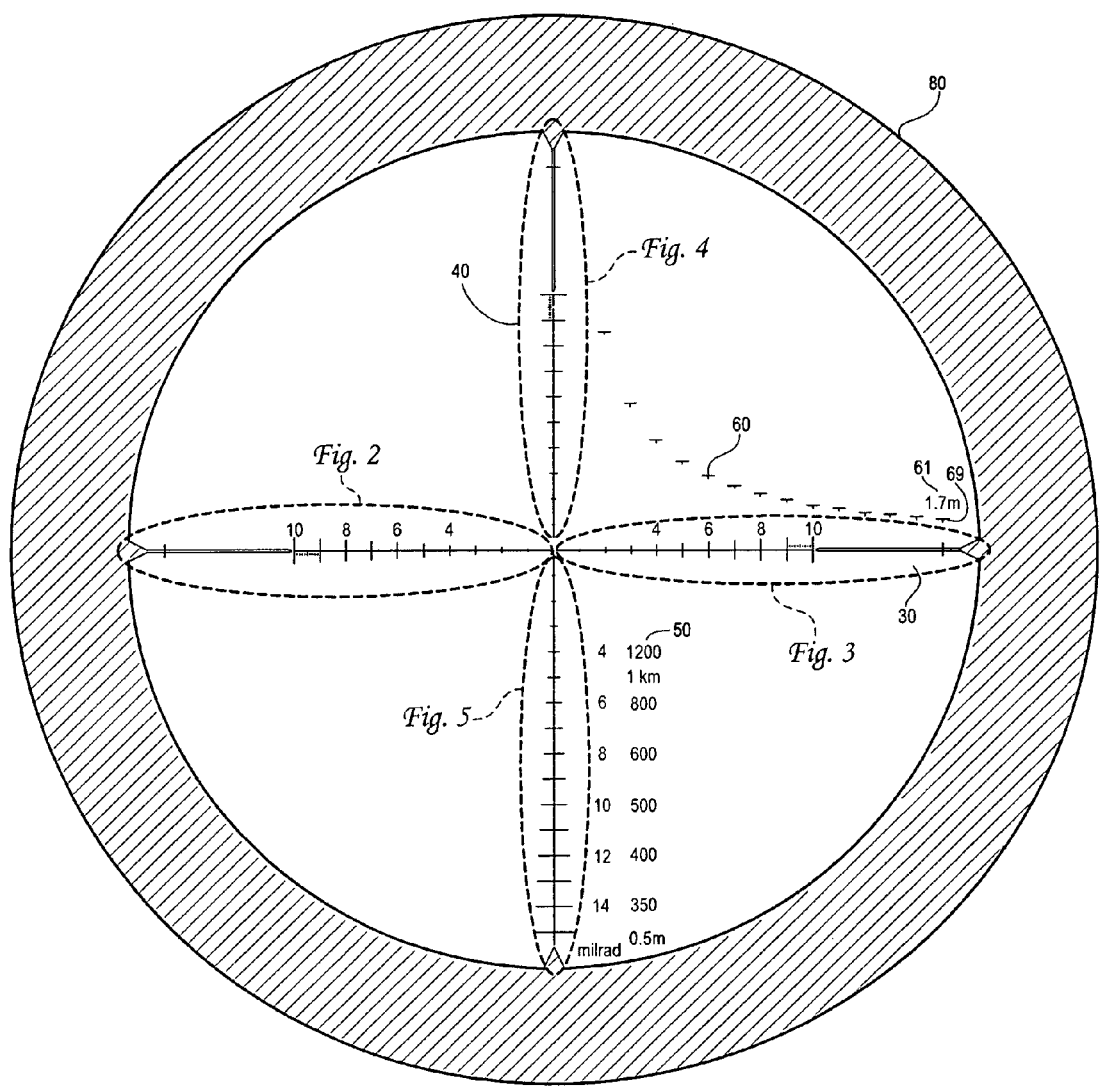
FIG. 1 is a front view of the present invention.
Figure 2:
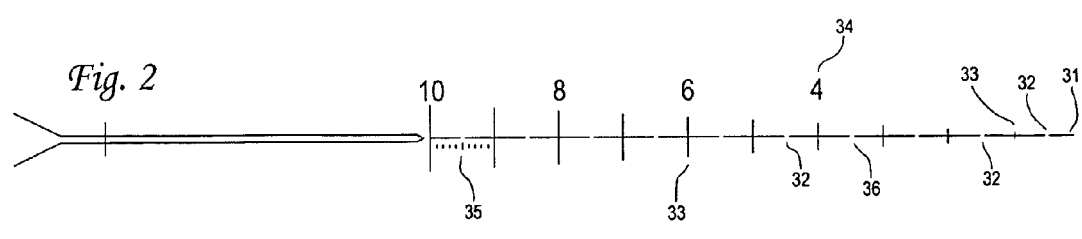
FIG. 2 is a front view of the left section.
Figure 3:
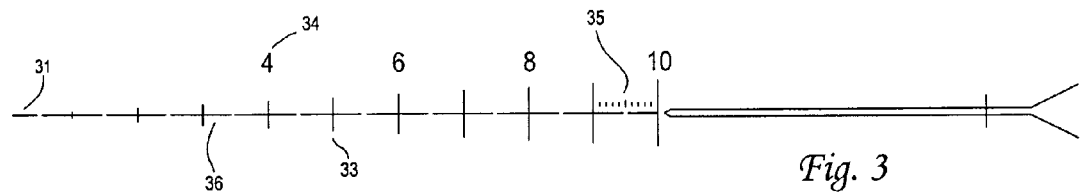
FIG. 3 is a front view of the right section.
Figure 4:
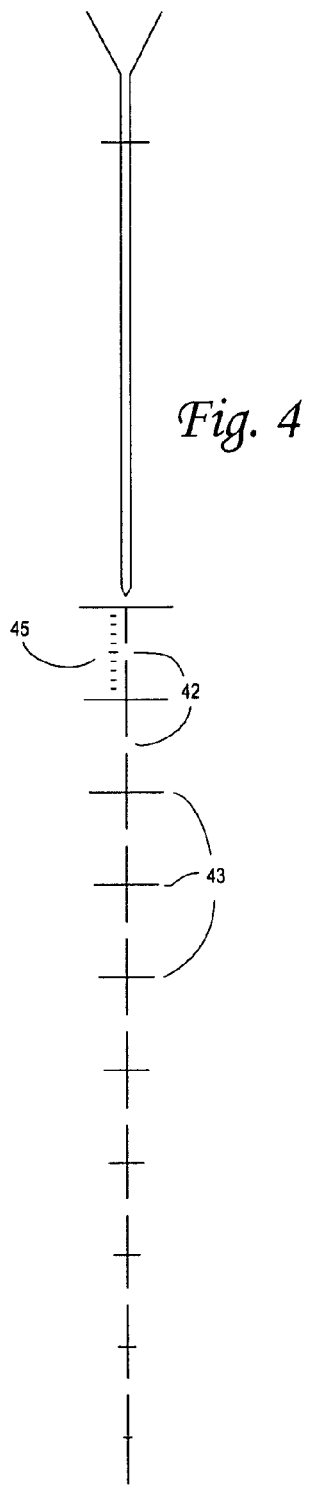
FIG. 4 is a front view of the top section.
Figure 5:
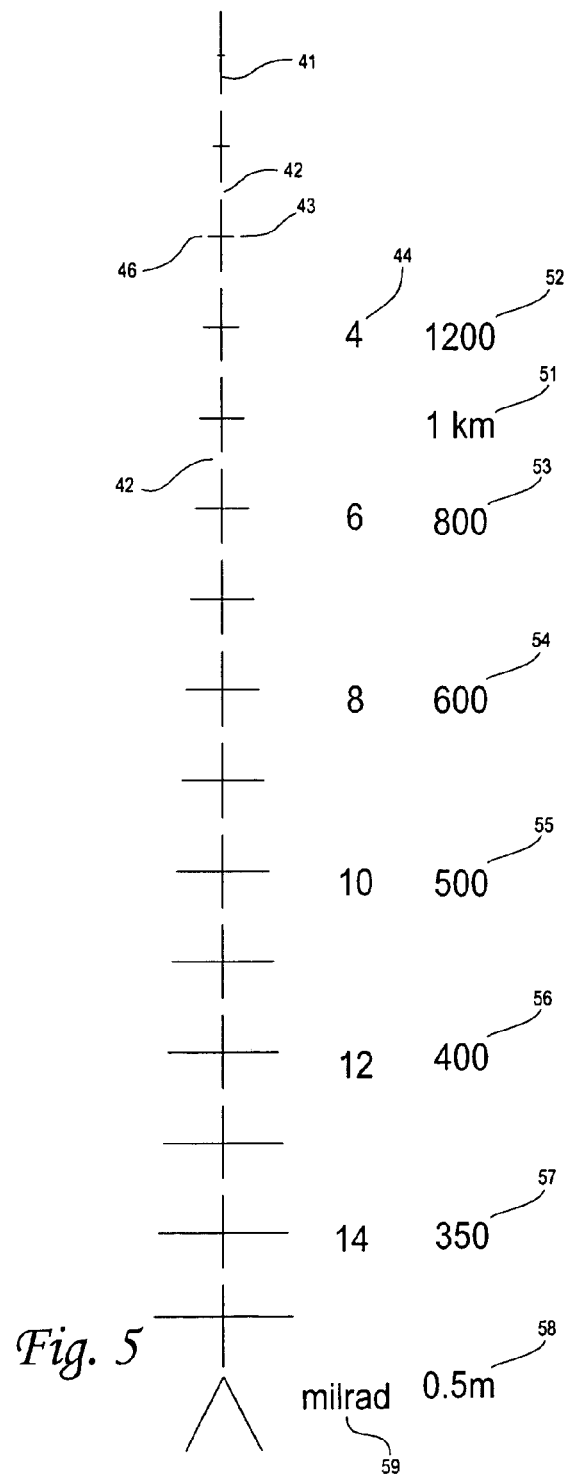
FIG. 5 is a front view of the bottom section.
Figure 6:
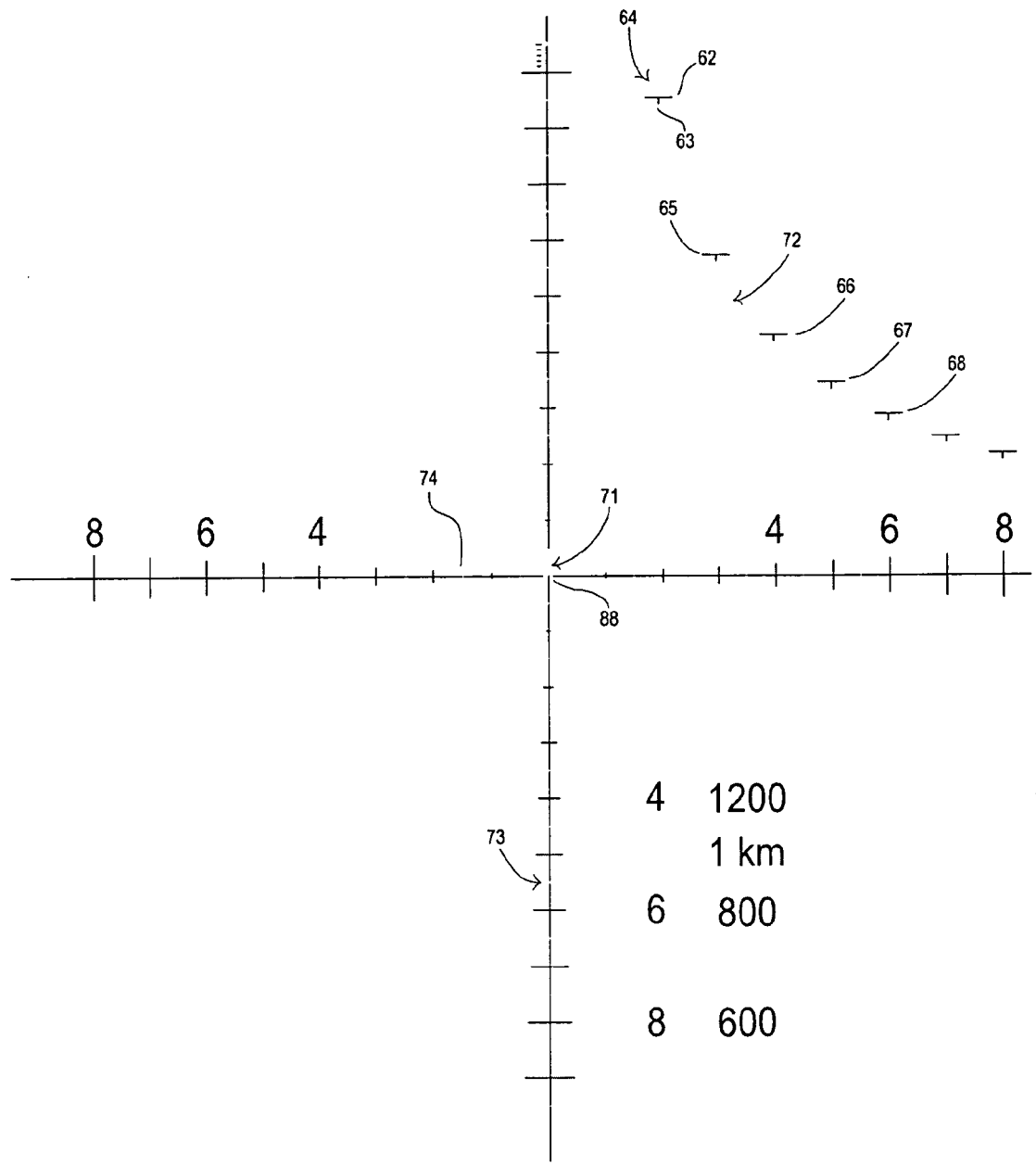
FIG. 6 is a zoom view of the middle section.

The following call out list of elements may be a useful guide in referencing the elements of the drawings.

30 Horizontal Section
31 Horizontal Section Horizontal Line
32 Horizontal Section Gap
33 Horizontal Section Vertical Line
34 Horizontal Numbered Range Indicator
35 Horizontal Minute Of Angle Ruler
36 Horizontal Non-Numbered Range Indicator
40 Vertical Section
41 Vertical Section Vertical Line
42 Vertical Section Gap
43 Vertical Section Horizontal Line
44 Vertical Numbered Range Indicator
45 Vertical Minute Of Angle Ruler
46 Vertical Non-Numbered Range Indicator
50 Wide Measurement
51 Wide Measurement Kilometer Indication
52 Wide Measurement Highest Range Indicator
53 Wide Measurement First Range Indicator
54 Wide Measurement Second Range Indicator
55 Wide Measurement Third Range Indicator
56 Wide Measurement Fourth Range Indicator
57 Wide Measurement Lowest Range Indicator
58 Wide Measurement Units Indicator
59 Units Notation
60 Height Measurement
61 Height Measurement Units Indicator
62 Height Measurement Horizontal Line
63 Height Measurement Vertical Line
64 Height Measurement Lowest Range Indicator
65 Height Measurement First Range Indicator
66 Height Measurement Second Range Indicator
67 Height Measurement Third Range Indicator
68 Height Measurement Fourth Range Indicator
69 Height Measurement Highest Range Indicator
71 Target Clear Spot
72 Height Measurement Gap Series
73 Vertical Section Gap Series
74 Horizontal Section Gap Series
80 Ring
88 Midpoint

DETAILED DESCRIPTION OF THE PREFERRED EMBODIMENT

The present invention is a part of an optical device which is a reticle having a horizontal section 30, a vertical section 40, a ring 80 and a height measurement 60 and a wide measurement 50. The ring 80 can be a solid black portion bounding the other components of the reticle. The ring 80 is optional. The ring 80 can be thick or thin or dashed.

The horizontal section 30 is generally horizontal and intersects with the vertical section 40 which is generally vertical at a midpoint 88. The area immediately above the midpoint 88 is a target clear spot 71. Preferably the target clear spot does not have any markings at all within the limited area of the target clear spot.

The horizontal section 30 is comprised of a number of horizontal section horizontal lines 31. Between the horizontal section horizontal lines 31 are a number of horizontal section gaps 32. Preferably, the horizontal section gaps are at a midpoint between horizontal section horizontal lines 31. Horizontal section horizontal lines 31 further receive a horizontal section vertical line 33. The horizontal section vertical line 33 preferably are formed to cross the horizontal section horizontal lines 31 at a midpoint of the horizontal section horizontal line 31. It is preferred that the first few horizontal range indicators do not have a numbered indication. Preferably the first three horizontal section vertical lines are not indicated with any numeral, and thereafter starting at the fourth, the horizontal section vertical lines are denoted with even number markings only or in an alternating consecutive fashion such as odd-numbered markings only. Preferably, after the third range indicator, the fourth range indicator is a horizontal numbered range indicator 34. Up to the third range indicator, the range indicators would be horizontal non-numbered range indicators. The horizontal section gaps 32 are preferably approximately the thickness of the horizontal section vertical lines 33.

The horizontal minute of angle ruler 35 can be placed in an extreme left or right of the horizontal section 30. The horizontal minute of angle ruler 35 can be used to measure by a single or by sub minute of angle measurements. Fractional minute of angle measurements may be useful in determining the size or range of an object.

The article section 40 additionally has a vertical section vertical line 41. Between the vertical section vertical lines 41 are a number of vertical section gaps 42. Each of the vertical section vertical lines are preferably bisected by a vertical section horizontal line 43. The vertical section gap 42 has is preferably halfway between the vertical section of horizontal lines 43. Arranged similarly to the horizontal section, the vertical section has a plurality of vertical non-numbered range indicators 46 that are preferably the first three non-numbered range indicators. Afterwards, beginning from the fourth range indicator, it is preferred that the fourth range indicator is the first vertical numbered range indicator 44. The vertical numbered range indicator 44 can then alternate in progression to the highest numbered range indicator. The vertical section gaps 42 are preferably approximately the thickness of the vertical section horizontal line.

Additionally, a vertical minute of angle ruler can be disposed on a terminal portion of the vertical section to allow fractional minute of angle measurements, which may be useful in determining the size or range of an object. Another useful guide can be the units notation 59 which preferably shows as milrad to explain the vertical numbered range indicator units 44 and also the horizontal numbered range indicator 34.

A wide measurement system 50 correlates the width of the vertical section horizontal line 43 in the lower portion of the vertical section with a range distance such that the wide measurement units indicator 58 is equivalent to how wide an object is at the range indicated. For example, the wide measurement highest range indicator 52 has a corresponding vertical section horizontal line that matches the wide measurement units indicator 58 at the stated range of the highest range indicator 52. The wide measurement highest range indicator 52 can be 1200 m for example The wide measurement first range indicator 53 can be 800 m for example and be related to and marked next to a corresponding vertical section horizontal line 43. Similarly a wide measurement second range indicator 54 can be indicated as 600 m and be correlated to a vertical section horizontal line that is wider than the vertical section horizontal line of the wide measurement first range indicator. The wide measurement units indicator 50 is preferably 0.5 m, but can be any other predefined setting.

The wide measurement third range indicator 55 can be correlated to 500 m, and the wide measurement fourth range indicator 56 can be correlated to 400 m. Finally, the wide measurement lowest range indicator 57 can be correlated to 350 m. The 350 m marking is not related to the adjacent fourteen milrad indication since the milrad indication is based on the distance from the midpoint or as the 350 m marking is based on how wide the vertical section horizontal line 43 is. It is preferred that the vertical section horizontal lines increase in width or one can also say increase in length as the vertical section horizontal lines progress away from the midpoint 88. Optionally, as a convenience or quick reference, a wide measurement kilometer indication 51 can be added to show that a 0.5 m target is approximately 1 km away.

The top right quadrant preferably includes a height measurement system 60 that has a number of height measurement indicators. For example, a height measurement units indicator 61 could potentially be sized for 1.7 m which is typical human height in military applications. The height measurement indicators preferably curve downward.

The height measurement horizontal line 62 preferably includes a height measurement vertical line 63 extending from a midpoint of the height measurement horizontal line 62. It is preferred that the height measurement vertical line 63 extends downward from the height measurement horizontal line 62. The height measurement horizontal line 62 has a distance, or more accurately a height from the horizontal section horizontal line 31 that can be used to represent ground.

The height measurement lowest range indicator 64 is preferably closest to the vertical section followed by the height measurement first range indicator 65 which is lower than the height measurement lowest range indicator 64. The height measurement second range indicator 66, the height measurement third range indicator 67, the height measurement fourth range indicator 68, in series until the height measurement highest range indicator 69 provide a continually falling scale of decreasing height from the horizontal section 30. As the height range indicators decrease in height, the correlated range increases. A user frames a 1.7 m target by measuring the height of the target between the horizontal section 30 and the respective height measurement range indicator. The correlated range is preferably not printed on the glass, but a user may memorize the correlated range such that a user would know the range based upon the framed height of the target.

In a best mode of the present invention it is preferred that the vertical section 40 have the first vertical section horizontal line 43 representing 0.15 mil, and the second line representing 0.2, with the third line representing in the, the fourth line representing 0.4, the fifth line representing 0.5 and the sixth line representing 0.6. The 0.4 would be numbered as 4 without the dot for the decimal place. The numbering from the midpoint downward should be 4 on the fourth vertical section horizontal line 43. Between the fourth vertical section horizontal line and the sixth vertical section horizontal line is preferably a fifth vertical section horizontal line. Between the fifth vertical section horizontal line and the fourth vertical section horizontal line is a vertical section gap 42. Also, between the fifth vertical section horizontal line and the sixth vertical section horizontal line is another vertical section gap 42. The vertical section gap therefore denotes a half of 0.1 milrad except for the first section next to the midpoint 88. The horizontal section is similarly denoted with a horizontal section gap marking half of 0.1 milrad, except for the first section next to the midpoint 88.

The present invention uses gaps to provide an area of clear glass to frame a target object including a target clear spot 71 immediately above the midpoint 88. Additionally, a height measurement gap series 72 comprises a number of gaps between successive portions of the height measurement system 60 forming a staircase like design such that the height measurement gap series 72 appear as spaces between the steps of the staircase. The user may use the height measurement gap series 72 to approximate a height of a target since a target may not be exactly on a range increment denoted on the reticle. The horizontal section gap series 74 comprises a number of gaps preferably showing half of 0.1 milrad and the vertical section gap series 73 preferably comprises a number of gaps also preferably showing half of 0.1 milrad.

The foregoing describes the preferred embodiments of the invention. Modifications may be made without departing from the spirit and scope of the invention as set forth in the following claims. The present invention is not limited to the embodiments described above, but encompasses any and all embodiments within the scope of the following claims. For example, the reticle may be made in a variety of different colors. Therefore, while the presently preferred form of the massaging chair has been shown and described, and several modifications thereof discussed, persons skilled in this art will readily appreciate that various additional changes and modifications may be made without departing from the spirit of the invention, as defined and differentiated by the following claims.

The invention claimed is:
1. A reticle comprising:
    a. a horizontal section having horizontal section horizontal lines broken by horizontal section gaps between the horizontal section horizontal lines, wherein the horizontal section has horizontal section vertical lines;
    b. a vertical section having vertical section vertical lines broken by vertical section gaps between the vertical section vertical lines, wherein the horizontal section intersects the vertical section at a midpoint, wherein the vertical section has vertical section horizontal lines;
    c. a wide measurement ranging system, wherein the wide measurement ranging system includes range indicators including a highest range indicator, the plurality of intermediate range indicators, and a lowest range indicator, wherein the range indicators are correlated to the width of the vertical section horizontal lines; and
    d. a height measurement ranging system including range indicators which include height measurement horizontal lines and which include a height measurement lowest range indicator closest to the vertical section, a plurality of height measurement intermediate range indicators, and a height measurement highest range indicator.

2. The reticle of claim 1, further comprising a ring bounding the reticle.

3. The reticle of claim 1, wherein the vertical section gaps have a thickness of approximately a thickness of vertical section vertical lines and the horizontal section gaps have a thickness of approximately a thickness of horizontal section horizontal lines.

4. The reticle of claim 1, wherein at least some of the vertical section gaps denote half of 0.1 mil and wherein at least some of the horizontal section gaps denote half of 0.1 mil.

5. The reticle of claim 1, wherein the height measurement ranging system is located in the top right quadrant of the reticle.

6. The reticle of claim 1, wherein the height measurement ranging system includes at least fourteen height measurement horizontal lines.

7. The reticle of claim 1, wherein the height measurement ranging system includes at height measurement horizontal lines, at least some of which have a height measurement vertical line extending downward from a midpoint of a height measurement horizontal line.

8. The reticle of claim 1, wherein the a wide measurement ranging system has wide measurement range indicators set for 0.5 meters in width.

9. The reticle of claim 1, wherein the a height measurement ranging system has height measurement range indicators set for 1.7 meters in height.

10. The reticle of claim 1, further comprising a target clear spot immediately above the midpoint.

11. The reticle of claim 10, further comprising a ring bounding the reticle.

12. The reticle of claim 10, wherein the vertical section gaps have a thickness of approximately a thickness of vertical section vertical lines and the horizontal section gaps have a thickness of approximately a thickness of horizontal section horizontal lines.

13. The reticle of claim 10, wherein at least some of the vertical section gaps denote half of 0.1 mil and wherein at least some of the horizontal section gaps denote half of 0.1 mil.

14. The reticle of claim 10, wherein the height measurement ranging system is located in the top right quadrant of the reticle.

15. The reticle of claim 10, wherein the height measurement ranging system includes at least fourteen height measurement horizontal lines.

16. The reticle of claim 10, wherein the height measurement ranging system includes at height measurement horizontal lines, at least some of which have a height measurement vertical line extending downward from a midpoint of a height measurement horizontal line.

17. The reticle of claim 10, wherein the a wide measurement ranging system has wide measurement range indicators set for 0.5 meters in width.

18. The reticle of claim 10, wherein the a height measurement ranging system has height measurement range indicators set for 1.7 meters in height.

* * * * *